(12) United States Patent
Schacht et al.

(10) Patent No.: US 11,982,348 B2
(45) Date of Patent: May 14, 2024

(54) DUAL DOUBLE SYNCHRONIZER E-TRANSMISSION FOR REDUCING TORQUE INTERRUPTION DURING GEAR SHIFTS

(71) Applicant: Dana Belgium N.V., Flanders (BE)

(72) Inventors: Filip D. Schacht, Meulebeke (BE); Kurt Cattoor, Koolkerke (BE)

(73) Assignee: DANA BELGIUM N.V., Bruges (BE)

( * ) Notice: Subject to any disclaimer, the term of this patent is extended or adjusted under 35 U.S.C. 154(b) by 153 days.

(21) Appl. No.: 17/449,773

(22) Filed: Oct. 1, 2021

(65) Prior Publication Data

US 2023/0103830 A1 Apr. 6, 2023

(51) Int. Cl.
*F16H 3/00* (2006.01)
*F16H 61/04* (2006.01)

(52) U.S. Cl.
CPC ......... *F16H 61/0403* (2013.01); *F16H 3/006* (2013.01); *F16H 2061/0422* (2013.01); *F16H 2061/0433* (2013.01); *F16H 2061/0492* (2013.01); *F16H 2312/02* (2013.01)

(58) Field of Classification Search
CPC ............... F16H 61/0403; F16H 3/006; F16H 2061/0422; F16H 2061/0433; F16H 2061/0492; F16H 2312/02
USPC .................................................... 74/661, 330
See application file for complete search history.

(56) References Cited

U.S. PATENT DOCUMENTS

| | | | | |
|---|---|---|---|---|
| 8,771,143 B2* | 7/2014 | Tanba | ................... | B60W 10/08 477/84 |
| 9,340,100 B2* | 5/2016 | Park | ...................... | B60K 6/442 |
| 9,469,294 B2* | 10/2016 | Takahashi | ............. | B60W 10/10 |
| 9,874,266 B2* | 1/2018 | Yang | ..................... | B60K 17/356 |
| 10,315,659 B2* | 6/2019 | Jacoby | ................... | B60K 6/547 |
| 11,199,257 B2* | 12/2021 | Rinderknecht | ..... | F16H 61/0403 |
| 2002/0033059 A1 | 3/2002 | Pels et al. | | |
| 2002/0189397 A1* | 12/2002 | Sakamoto | ............. | B60W 10/10 74/661 |
| 2010/0048338 A1 | 2/2010 | Si | | |
| 2015/0211615 A1 | 7/2015 | Yang et al. | | |
| 2016/0347320 A1 | 12/2016 | Zhu et al. | | |

FOREIGN PATENT DOCUMENTS

EP 1610038 A1 12/2005

* cited by examiner

*Primary Examiner* — Ha Dinh Ho
(74) *Attorney, Agent, or Firm* — McCoy Russell LLP

(57) ABSTRACT

Methods and systems are provided for a dual motor electric transmission configured with two dual synchronizers to reduce torque interruption during gear shifting. In one example, a method may include dropping torque of a first electric motor, allowing a first synchronizer to shift from a first gear arrangement to a second gear arrangement, and compensating for dropped torque with a second electric motor. The method may be repeated to shift a second synchronizer from the first gear arrangement to the second gear arrangement, allowing uninterrupted torque supply during gear shifting.

13 Claims, 7 Drawing Sheets

DUAL DOUBLE SYNCHRONIZER E-TRANSMISSION FOR REDUCING TORQUE INTERRUPTION DURING GEAR SHIFTS

TECHNICAL FIELD

The present description relates generally to methods and systems for a dual motor, dual double synchronizer e-transmission for reducing torque interruptions during gear shifts.

BACKGROUND AND SUMMARY

In a two-speed battery electric transmission, particularly in vehicles designed for off-highway applications, it is desired to increase efficiency and ensure gear shifting occurs without undesirable torque interruptions. Wet clutches and planetary gear sets are often employed in such transmissions. For example, a hydraulic clutch may be engaged during a gear shift, where fluid is used to generate hydraulic pressure that releases or engages a clutch pressure plate to disengage or engage the hydraulic clutch. Planetary gear sets may be implemented in a vehicle to increase the number of gear ratios available to the transmission. However, electric vehicles (EVs) may not have hydraulic power available, and to implement hydraulic actuated wet clutches in an EV would create an additional vehicle cost associated with installing an electrically driven hydraulic power source. Also, while planetary gear sets may provide gear ratio flexibility in the transmission, each included planetary gear set increases cost, size, and complexities associated with the transmission package and installation. Still, an electric transmission system including electric motors where gear shifting occurs without torque interruption is desired.

A synchronizer may be implemented in a transmission to assist in maintaining uninterrupted torque during gear shifts. The synchronizer operates to synchronize speeds of an input shaft with the speed of the gear being selected during a gearshift prior to engagement of an upcoming gear. The input shaft may be an output from a power source, such as at least one electric motor in the case of EVs. Synchronizing speeds of the input shaft and the selected gear includes the synchronizer acting as a friction clutch to engage with and accelerate or decelerate the input shaft to match the speed of the selected gear so that gears of the input shaft mesh with the selected gear and provide a smooth gearshift. Synchronizers may be operated by multiple power sources including, but not limited to, electricity, compressed air, or hydraulic power.

Attempts to reduce torque interruption during gear shifts using a synchronizer include coupling a synchronizer to one of at least two power sources, adjusting speeds of the power sources, and shifting the synchronizer to adjust torque while shifting gears without torque interruption. One example approach is shown by Zhu et al. in U.S. 2016/0347320. Therein, a controlling apparatus and method for an electric drive transmission used in a dual-motor EV are disclosed, where a first motor outputs power with a single gear and a second motor selectively outputs power with two gears by means of a single synchronizer. In this way, loss in wheel driving torque caused by the second motor in the gear shifting procedure is compensated by the first motor so that gear shifting without power interruption can be achieved.

However, the inventors herein have recognized potential issues with such systems. As one example, inclusion of one synchronizer associated with one of two power sources allows selective output between two different gear arrangements for only the power source coupled with the synchronizer. While this may allow for the power source coupled to the synchronizer to shift between a first gear arrangement and a second gear arrangement, the power source not coupled with a synchronizer may remain in a first gear arrangement. Operation of the two power sources in two different gear arrangements may limit power output of the sources and limit overall torque output of the transmission.

Other attempts to reduce torque interruption have been made where a second synchronizer is included so that each of two power sources has an associated synchronizer. One example approach is shown by Pels et al. in U.S. 2002/0033059. Therein, a double clutch transmission is coupled with two electric units where each of the two electric units drives a gear input shaft. Each input shaft has a sliding sleeve (e.g., a synchronizer mechanism) positioned thereon which selectively couples the respective input shaft with gears on a single output shaft, so that power from each of the two electric units is summed on the single output shaft. This embodiment however includes dual clutches, which, as described above, may increase vehicle costs and complexity.

In one example, the issues described above may be addressed by a method for a transmission system comprising a first electric motor input shaft having two gears configured to mesh with a pair of gears of a first synchronizer on a lay shaft, a first electric motor coupled to the first electric motor input shaft, a second electric motor input shaft having at least one gear configured to mesh with one gear of another pair of gears of a second synchronizer on the lay shaft, and a second electric motor coupled to the second electric motor input shaft. The first electric motor and the second electric motor are configured to operate synchronously to increase torque supply with each of the first and the second synchronizers in a first gear arrangement, and independently to decrease torque supply to allow the respective first or the second synchronizer to shift to a second gear arrangement. In this way, both of the first and second electric motors are connected to a common output gear set via a set of ratios that may be individually adjusted to supply vehicle torque and therefore reduce undesired torque interruption.

As one example, both the first and the second synchronizers may be in the first gear arrangement prior to a gear upshift request. Upon request for the gear upshift, the first electric motor may drop torque, allowing the first synchronizer to shift from the first gear arrangement to the second gear arrangement. The second electric motor may increase torque to compensate for the drop in torque from the first electric motor, therefore maintaining an overall transmission torque output. After the first synchronizer has shifted to the second gear arrangement, the second electric motor may drop torque, allowing the second synchronizer to shift from the first gear arrangement to the second gear arrangement. The first electric motor may increase torque to compensate for the drop in torque from the second electric motor, therefore maintaining the overall transmission torque output. The inclusion of two synchronizers, one coupled to each of two power sources, may allow both power sources to produce torque across a low speed and a high speed range via shifting from the first gear arrangement to the second gear arrangement, respectively. Additionally, exclusion of clutches may reduce associated vehicle costs. The lay shaft with the first and the second synchronizers disposed thereon in series may be coupled to an output gear set, allowing for further torque reduction via a short drop gear and a long drop gear to adjust torque to meet vehicle operation requirements.

In this way, overall vehicle torque may be maintained during gear shifts, which may allow operator satisfaction regarding vehicle power and acceleration during gear shifts. Additionally, vehicle costs may be reduced compared to EVs where a hydraulic clutch and/or planetary gears are included to reduce torque interruption during gear shifts.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
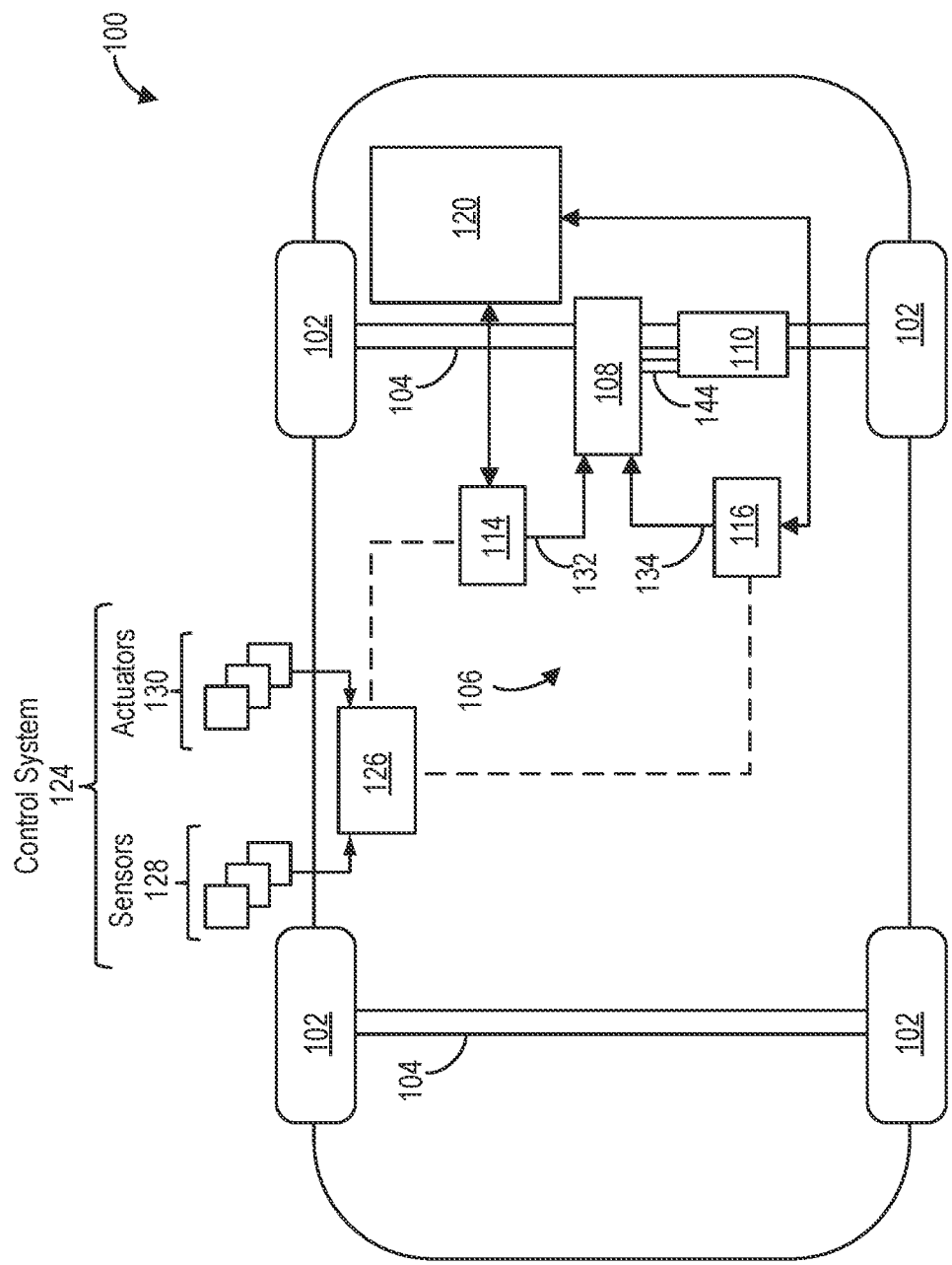
FIG. 1 shows a schematic diagram of an electrical drive train (e-drive) of a vehicle.
Figure 2A:
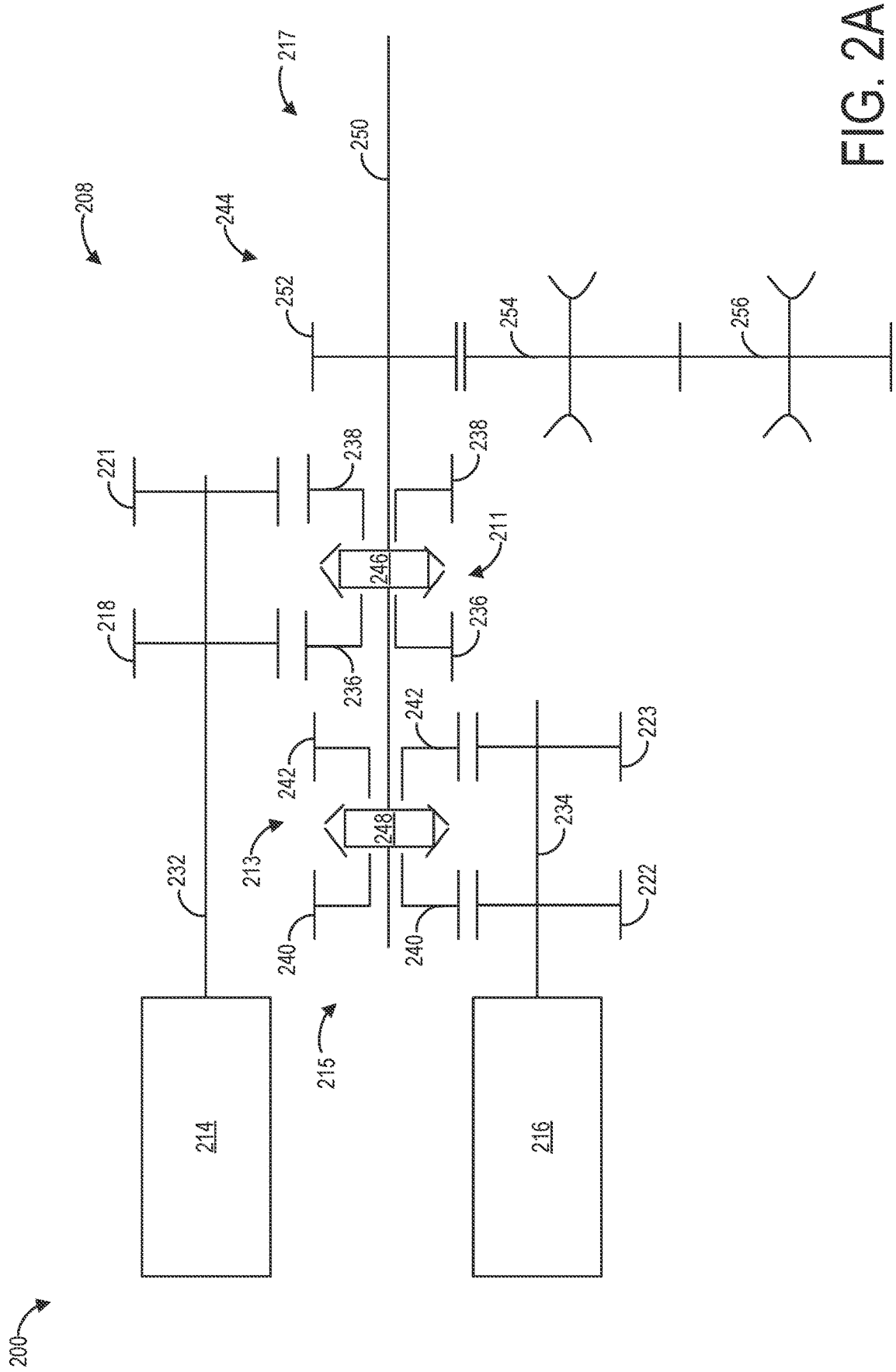
FIG. 2A shows a schematic diagram of an e-transmission, which may be part of the e-drive of FIG. 1.
Figure 2B:
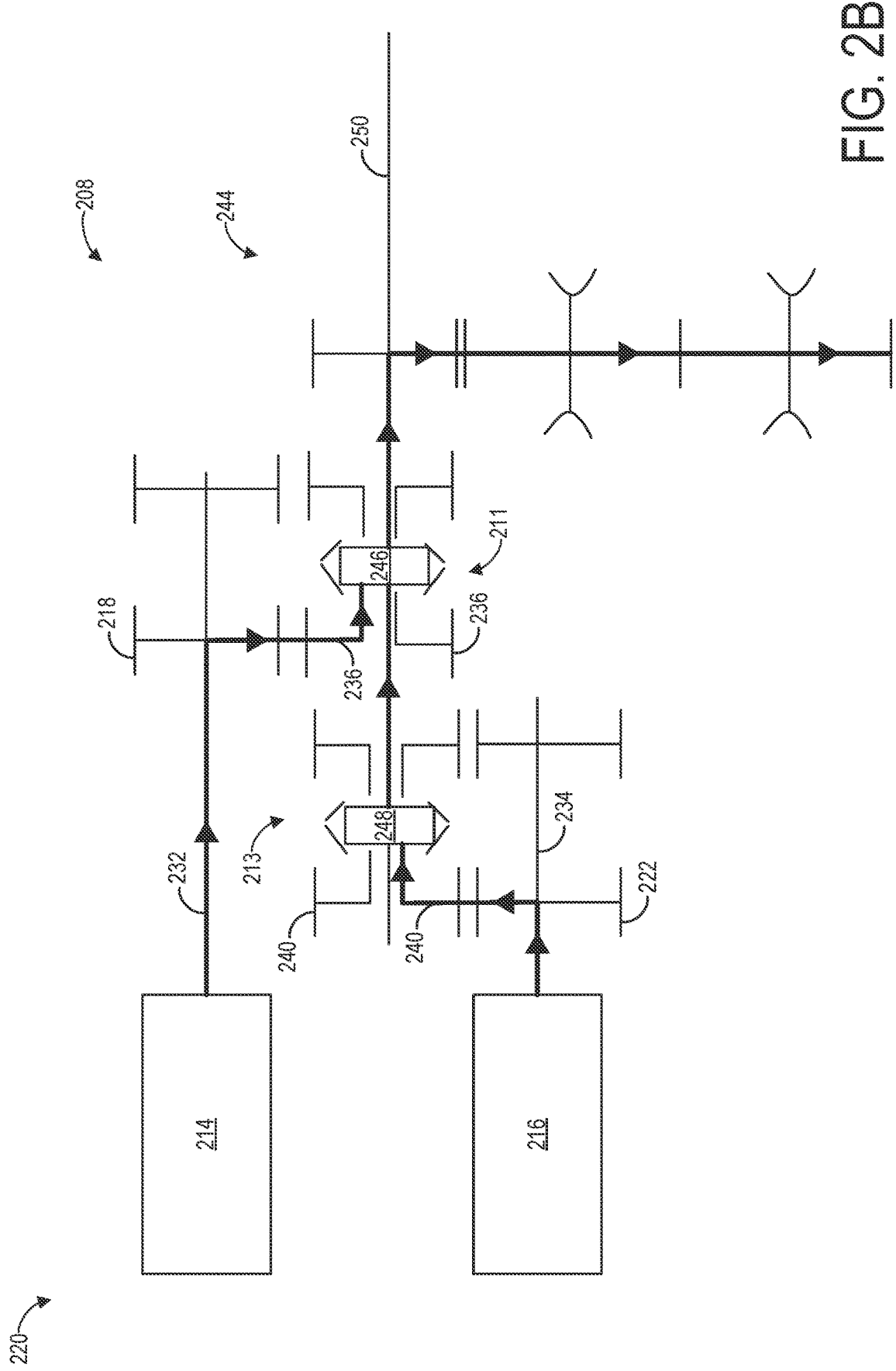
FIG. 2B shows a schematic diagram of a first power path of the e-transmission.
Figure 2C:
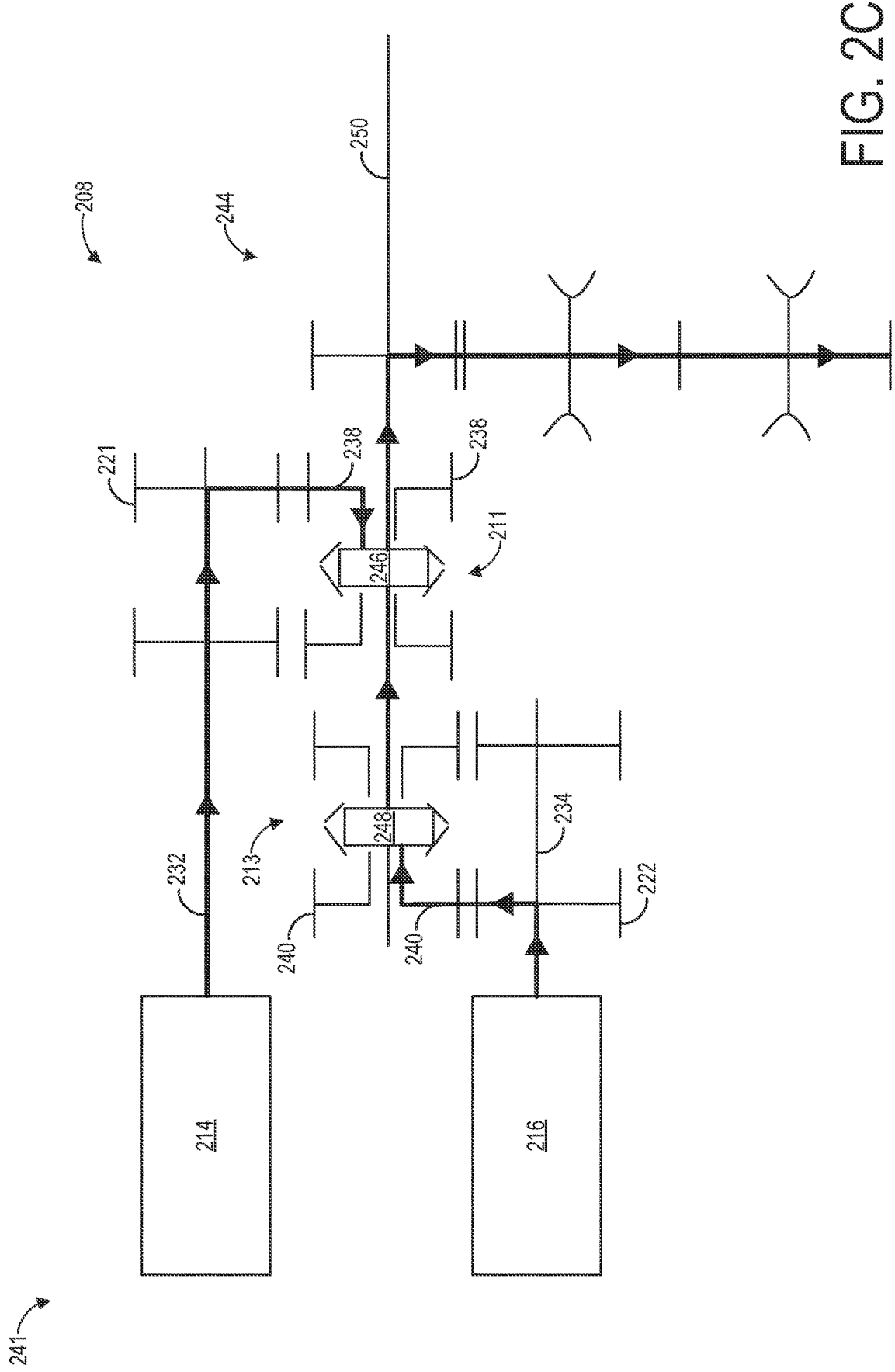
FIG. 2C shows a schematic diagram of a second power path of the e-transmission.
Figure 2D:
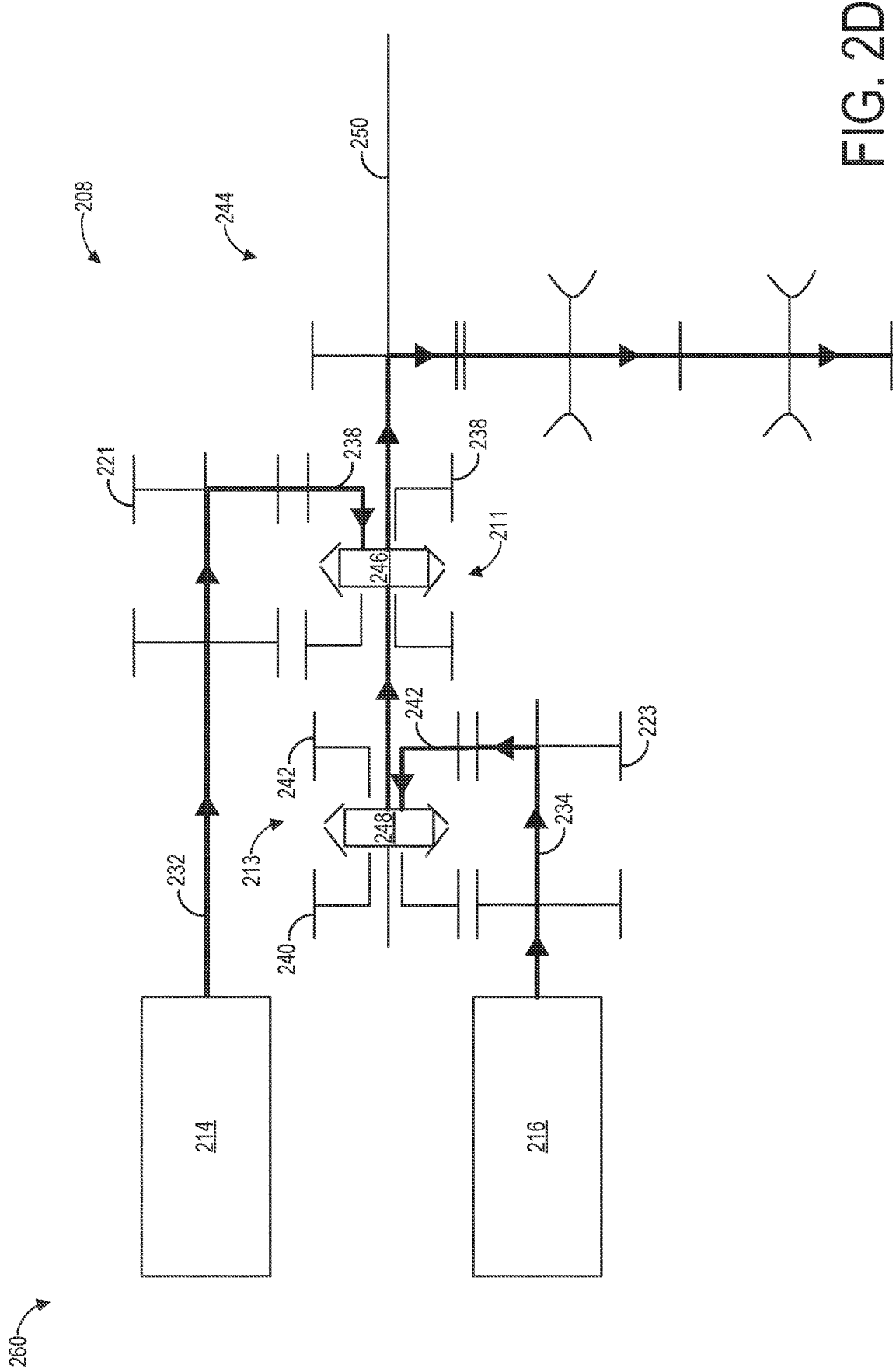
FIG. 2D shows a schematic diagram of a third power path of the e-transmission.

The following description relates to systems and methods for a dual motor, dual double synchronizer e-transmission for reducing torque interruptions during gear shifts. The e-transmission may be implemented in an electrical drive train (e-drive) of an electric vehicle (EV). An example schematic of the e-drive of an EV is shown in FIG. 1. In addition to the e-transmission, the e-drive of FIG. 1 includes two electric motors, each with a transmission input shaft. FIG. 2A shows a schematic diagram of the e-transmission with coupled electric motors. A first and a second transmission input shaft are coupled to a first and a second synchronizer, respectively, via fixed gears on the transmission input shafts. The first and the second synchronizers are positioned in series on a central lay shaft which is in turn coupled to an output gear set to transmit torque to axles to drive a set of vehicle wheels. The first and the second synchronizers may be shifted from a first gear arrangement to a second gear arrangement according to the method described in FIG. 3. A first, a second, or a third mechanical power path, as shown in FIGS. 2B-2D, respectively, may be active depending on the gear arrangement of the first and the second synchronizers. FIG. 4 shows an example timing diagram illustrating gear arrangements of the first and the second synchronizers, torque input of the first and the second electric motors, and overall output torque during the method of FIG. 3.

Turning now to FIG. 1, for an EV, torque may be provided to a vehicle's wheels from more than one source, including one or more electric motors. A schematic representation of a vehicle 100 is depicted in FIG. 1 which includes sets of wheels 102 coupled by axles 104 (e.g., pairs of wheels are coupled to one another by the axles 104). It will be appreciated that vehicle 100 is shown in FIG. 1 for illustrative purposes and is a non-limiting example of how an EV may be configured. Other examples include various arrangements and positioning of components of the vehicle described below as well as additional components not shown in FIG. 1 for brevity.

A drive train 106 of vehicle 100 may include a transmission 108 (e.g., a gear box, gear train, etc.) coupled to one or more of the axles 104 of vehicle 100. The transmission 108 may be coupled to a rear axle of the axles 104, as shown in FIG. 1, to a front axle or to both axles, in other examples. The transmission 108 may be mechanically coupled to a final drive 110 of the drive train 106 which, for example, may be a differential or any other suitable gearing. The transmission 108 and final drive 110 may together translate speed and torque from a rotating source to the vehicle wheels 102 to propel vehicle 100. In the present example, the transmission 108 includes two dual synchronizers positioned in series on a central lay shaft, to be further described in FIG. 2A. The transmission 108 may include a plurality of gears, as will be further described in FIG. 2A. The present configuration includes at least two transmission input shafts, including a first transmission input shaft 132 coupling a first electric machine 114 and the transmission 108, and a second transmission input shaft 134 coupling a second electric machine 116 and the transmission 108. Additionally, the transmission 108 may be mechanically coupled to the final drive 110 via an output gear set 144, also to be further described in FIG. 2A. In off-highway vehicle applications, a propshaft (not shown) may be included to mechanically couple output of the transmission to input of the axle, such as axles 104.

When configured as an EV, the rotating sources may be the first electric machine 114, and the second electric machine 116. In some examples, and as described herein, the first and second electric machines 114, 116 may be motor/generators, with a capacity to convert electrical energy into mechanical energy and vice versa. As such, the electric machines may hereafter also be referred to as motors and/or generators. The first and second electric machines 114, 116 may be electrically coupled to a traction battery 120 of vehicle 100 to both draw power from the traction battery 120 and provide electrical energy to be stored at the traction battery 120. The electric machines may be similarly configured, e.g., having similar operational speed and torque ranges, and thereby referred to as symmetric, or may have different speed and torque outputs, thereby referred to as asymmetric.

Adjustment of the drive train between the various modes as well as control of operations within each mode may be executed based on a vehicle control system 124, including a controller 126, as shown in FIG. 1. Controller 126 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 126 may be a powertrain control module (PCM).

Controller 126 may receive various signals from sensors 128 coupled to various regions of vehicle 100. For example, the sensors 128 may include sensors at the first and second electric machines 114, 116 to measure motor speed and motor temperature, a pedal position sensor to detect a depression of an operator-actuated pedal, such as an accelerator pedal or a brake pedal, speed sensors at the vehicle wheels 102, etc. Vehicle acceleration is directly proportional to accelerator pedal position, for example, degree of depression. Upon receiving the signals from the various sensors 128 of FIG. 1, controller 126 processes the received signals, and employs various actuators 130 of vehicle 100 to adjust drive train operations based on the received signals and instructions stored on the memory of controller 126. For example, controller 126 may receive an indication of depression of the brake pedal, signaling a desire for decreased vehicle speed. In response, the controller 126 may command operation of at least one of the electric machines as a generator to recharge the traction battery 120.

In the present embodiment, an e-drive is configured to reduce torque interruption during gear shifts in a dual motor EV using two dual synchronizers on a central lay shaft. Each of the two motors has an input shaft by which power from the respective electric motor is transferred to the central lay shaft, where the power from the electric motors is summed. The motor input shafts are coupled to the central lay shaft by engaging one of at least one fixed gear on each input shaft with one of two synchronizers disposed on the central lay shaft. The synchronizers are dual synchronizers, which allows each synchronizer to engage with two different gears. In one example, one motor input shaft includes two fixed gears and the corresponding synchronizer can selectively engage with either of the two fixed gears. Additionally, the fixed gears may have different gear ratios such that when a first fixed gear is engaged with the synchronizer, the gear ratio may be greater than when a second fixed gear is engaged with the synchronizer. The second motor input shaft may have either one or two fixed gears with which the corresponding synchronizer can engage. In an example where the second motor input shaft has two fixed gears, the fixed gears of the second motor input shaft may also have different gear ratios from each other. Different gear ratios for fixed gears on the first and the second motor input shafts may allow the two electric motors to supply different speed and torque values, both in regards to which fixed gear on the respective motor input shaft is engaged with the respective synchronizer and in regards to the other electric motor. The variation in speed and torque values may be useful in off-highway applications, allowing the electric motors to adjust torque supply depending on vehicle needs, for example, during vehicle launch compared to vehicle cruise.

As briefly described above, when vehicle 100 of FIG. 1 is an EV, drive train 106 includes transmission 108 coupled with the first and the second electric machines 114, 116, herein referred to as electric motors, via the first and the second transmission input shafts 132, 134. A schematic of e-drive 200 shown by FIG. 2A may illustrate the drive train 106 of FIG. 1 for an EV in further detail. It will be appreciated that components of the e-drive 200 having substantially similar function to components of the drive train 106 may be labeled with corresponding numbers, prefixed with a "2" instead of a "1". For example, a first electric motor (EM) 214 may be an example of the first electric machine 114.

The e-drive 200 is configured with a transmission 208, a first electric motor 214, and a second electric motor 216. The first and the second electric motors 214, 216 may operate synchronously, that is the electric motors may operate at the same time to supply the same amount of torque, or independently to each supply a different torque value.

A central lay shaft 250 is positioned with a first portion 215 between a first transmission input shaft 232 coupled to the first electric motor 214 and a second transmission input shaft 234 coupled to the second electric motor 216. Each of the first and the second transmission input shafts 232, 234 may have at least one fixed gear. In one example, the first transmission input shaft 232 has a first fixed gear 218 and a second fixed gear 221, and the second transmission input shaft 234 has a third fixed gear 222. In some applications of the present system, one fixed gear on a transmission input shaft of the two transmission input shafts may be sufficient to supply vehicle torque and reduce torque interruption during gear shifts. This may reduce cost associated with gears and the vehicle transmission. In another example, the second transmission input shaft 234 includes the third fixed gear 222 and a fourth fixed gear 223. Inclusion of two fixed gears on each of the two transmission input shafts may allow at least one of the two electric motors to be coupled to an output gear set via the central lay shaft, described below, during gear shifts to drive the vehicle.

The first portion 215 of the central lay shaft 250 is configured with two dual (e.g., double cone) synchronizers, in series, including a first synchronizer 211 and a second synchronizer 213. Being dual synchronizers, the first and the second synchronizers 211, 213, each have two gears with which the synchronizers may engage with input gears. For example, the first synchronizer 211 has a first gear 236 and a second gear 238. The first synchronizer 211 may selectively engage with either the first fixed gear 218 of the first transmission input shaft 232 via the first gear 236 or with the second fixed gear 221 of the first transmission input shaft 232 via the second gear 238. The second synchronizer 213 may have a similar configuration as the first synchronizer 211, where the second synchronizer 213 includes a third gear 240 and a fourth gear 242. The second synchronizer 213 may selectively engage with the third fixed gear 222 of the second transmission input shaft 234 via the third gear 240. In an embodiment where the second transmission input shaft includes the third fixed gear 222 and the fourth fixed gear 223, the second synchronizer 213 may selectively engage with the fourth fixed gear 223 of the second transmission input shaft 234 via the fourth gear 242. The first and the second synchronizers 211, 213 may each selectively engage with fixed gears of the first and second transmission input shafts 232, 234, respectively, by sliding the respective synchronizer along the central lay shaft 250 upon actuation by a selector fork.

The first synchronizer 211 includes a first selector fork 246 and the second synchronizer 213 includes a second selector fork 248. Each of the first and second selector forks 246, 248 may enable movement of each of the corresponding synchronizers to engage or disengage one or more gears on the first and the second transmission input shafts 232, 234, respectively. In each case, movement of the synchronizers may be accomplished via the selector forks (e.g. 246, 248) moving each of the respective synchronizers to a desired position relative to the first, second, third, or fourth fixed gear 218, 221, 222, 223.

Movement of synchronizers via selector forks may be carried out via actuators of the control system, described in FIG. 1. Synchronizer movement may be based on input from various sensors of the control system of FIG. 1, and may include but are not limited to transmission range (first gear arrangement, second gear arrangement, etc., as described below), vehicle speed, throttle pedal position, ambient temperature, steering angle, brake inputs, electric machine speed and torque (for both the first and the second electric motors 214, 216), and transmission input shaft speed (for both the first transmission input shaft 232 and the second transmission input shaft 234).

Engaging each of the first and the second synchronizers 211, 213 with gears on the corresponding first or second transmission input shafts 232, 234 creates a gear ratio between the corresponding first or second electric motors 214, 216 and the central lay shaft 250. For example, for the first electric motor 214, when the first fixed gear 218 is engaged with the first synchronizer 211, as described above, a first gear ratio is created. In one example, the first gear ratio is 2.78 to 1. When the second fixed gear 221 is engaged with the first synchronizer 211, a second gear ratio is created. In one example, the second gear ratio is 1 to 1. For the second electric motor 216, when the third fixed gear 222 is engaged with the second synchronizer 213, a third gear ratio is created. In one example, the third gear ratio is 2.78 to 1. When the fourth fixed gear 223 is included on the second transmission input shaft 234 and the fourth fixed gear 223 is engaged with the second synchronizer 213, a fourth gear ratio is created. In one example, the fourth gear ratio is 1 to 1. An example overall transmission ratio for the first synchronizer 211 is 6.255 to 9.73. An example overall transmission ratio for the second synchronizer 213 is 2.25 to 3.5. The inclusion of two fixed gears on each of the two transmission input shafts, where either each of the two fixed gears on each transmission input shaft or the four total gears on both transmission input shafts have different gear ratios, may allow the two electric motors to operate within a demanded torque versus speed range, to be further described below.

Accordingly, as the first and the second synchronizers 211, 213 are disposed on the central lay shaft 250 in series, the central lay shaft 250 may simultaneously engage two different gear ratios (e.g. the first gear ratio when the first fixed gear 218 is engaged with the first synchronizer 211 and the fourth gear ratio when the fourth fixed gear 223 is engaged with the second synchronizer 213). In one example, the first and the third gear ratios are equal and the second and the fourth gear ratios are equal. In another example, each of the first, second, third, and fourth gear ratios are different.

When either the first or the second synchronizers 211, 213 is engaged in either the first or third gear ratios, respectively, the synchronizer may be said to be in a first gear arrangement. When either the first or the second synchronizers 211, 213 is engaged in either the second or fourth gear ratios, the synchronizer may be said to be in a second gear. The first and the third gear ratios may be greater than the second and the fourth gear ratios, therefore the first gear arrangement may have a higher gear ratio than the second gear arrangement. As a result, when either the first or the second synchronizers 211, 213 is in the first gear arrangement, the corresponding electric motor may be able to provide more power compared to when the synchronizer is in the second gear. The first gear arrangement may be considered a low speed range. When either the first or the second synchronizers 211, 213 is in the second gear arrangement, the corresponding electric motor may be able to operate at a lower speed compared to when the synchronizer is in the first gear arrangement. The second gear arrangement may be considered a high speed range, as lower speed operation of the electric motor at the same initial vehicle speed prior to shifting to the second gear may allow for an increase in vehicle speed. In one example, when the first and the second synchronizers 211, 213 are in the same gear (e.g., both in first gear arrangement), the gear ratios of each synchronizer may be equal and each motor may be operating at the same speed and torque output. In one example, a synchronizer is in the first gear arrangement when engaged with a gear resulting in any gear ratio lower than the ratio when the second gear arrangement is engaged.

The central lay shaft 250 may transfer torque from the first and the second electric motors 214, 216 via the first and the second synchronizers 211, 213, respectively, to an output gear set 244. Torque may be transferred from the output gear set 244 to a final drive, such as the final drive 110 of FIG. 1. The output gear set 244 may be perpendicular to the central lay shaft 250 and be coupled with the central lay shaft 250 at the first output gear 252 in a second portion 217 of the central lay shaft 250. The output gear set 244 may include a first output gear 252, a short drop output gear 254, and a long drop output gear 256 in series. The short drop output gear 254 and the long drop output gear 256 allow short drop or long drop variants, respectively, of power output to the final drive, which may be beneficial for use in a variety of off-highway applications. A fifth gear ratio of the output gear set 244 may be 2.25 to 3.5.

Shifting each of the first and the second synchronizers 211, 213 may direct input from the first and the second electric motors 214, 216 to different mechanical power paths, as shown in FIGS. 2B-2D. The mechanical power paths shown in FIGS. 2B-D are depicted by bold lines with arrows showing power flow through gears transmission input shafts, fixed gears, synchronizers, and the common lay shaft as described above with respect to FIG. 2A and further described in FIG. 3.

A first mechanical power path 220 is active when both the first and the second synchronizers 211, 213 are in the first gear arrangement, as shown in FIG. 2B. Power flows from the first electric motor 214 to the first synchronizer 211 via the first transmission input shaft 232 and the first fixed gear 218 coupled to the first gear 236 of the first synchronizer 211. Power flows from the second electric motor 216 to the second synchronizer 213 via the second transmission input shaft 234 and the third fixed gear 222 coupled to the third gear 240 of the second synchronizer 213. Power from the first and the second electric motors 214, 216 is summed on the central lay shaft 250 and output to the output gear set 244.

A second mechanical power path 241 is active when the first synchronizer 211 is in the first gear arrangement and the second synchronizer 213 is in the second gear arrangement, as shown in FIG. 2C. Power flows from the first electric motor 214 to the first synchronizer 211 via the first transmission input shaft 232 and the second fixed gear 221 coupled to the second gear 238 of the first synchronizer 211. Power flows from the second electric motor 216 to the second synchronizer 213 via the second transmission input shaft 234 and the third fixed gear 222 coupled to the third gear 240 of the second synchronizer 213. Power from the first and the second electric motors 214, 216 is summed on the central lay shaft 250 and output to the output gear set 244.

A third mechanical power path 260 is active when both the first and the second synchronizers 211, 213 are in the second gear arrangement, as shown in FIG. 2D. Power flows from the first electric motor 214 to the first synchronizer 211 via the first transmission input shaft 232 and the second fixed gear 221 coupled to the second gear 238 of the first synchronizer 211. Power flows from the second electric motor 216 to the second synchronizer 213 via the second transmission input shaft 234 and the fourth fixed gear 223 of the second synchronizer 213. Power from the first and the second electric motors 214, 216 is summed on the central lay shaft 250 and output to the output gear set 244.

Torque interruption during gear shifting may be reduced by the dual motor e-drive configured with two dual synchronizers on a central lay shaft which may be selectively coupled to fixed gears on either of two motor transmission input shafts to shift between a first gear arrangement and a second gear arrangement to adjust torque and speed contribution from each of the two motors. By shifting the gear arrangement of the first and the second synchronizer independently, torque contribution from each of the two motors may be independently adjusted. A method by which motor power and speed contribution are adjusted using the two dual synchronizers to reduce torque interruption during gear shifting is described in method 300 of FIG. 3.

Figure 3:
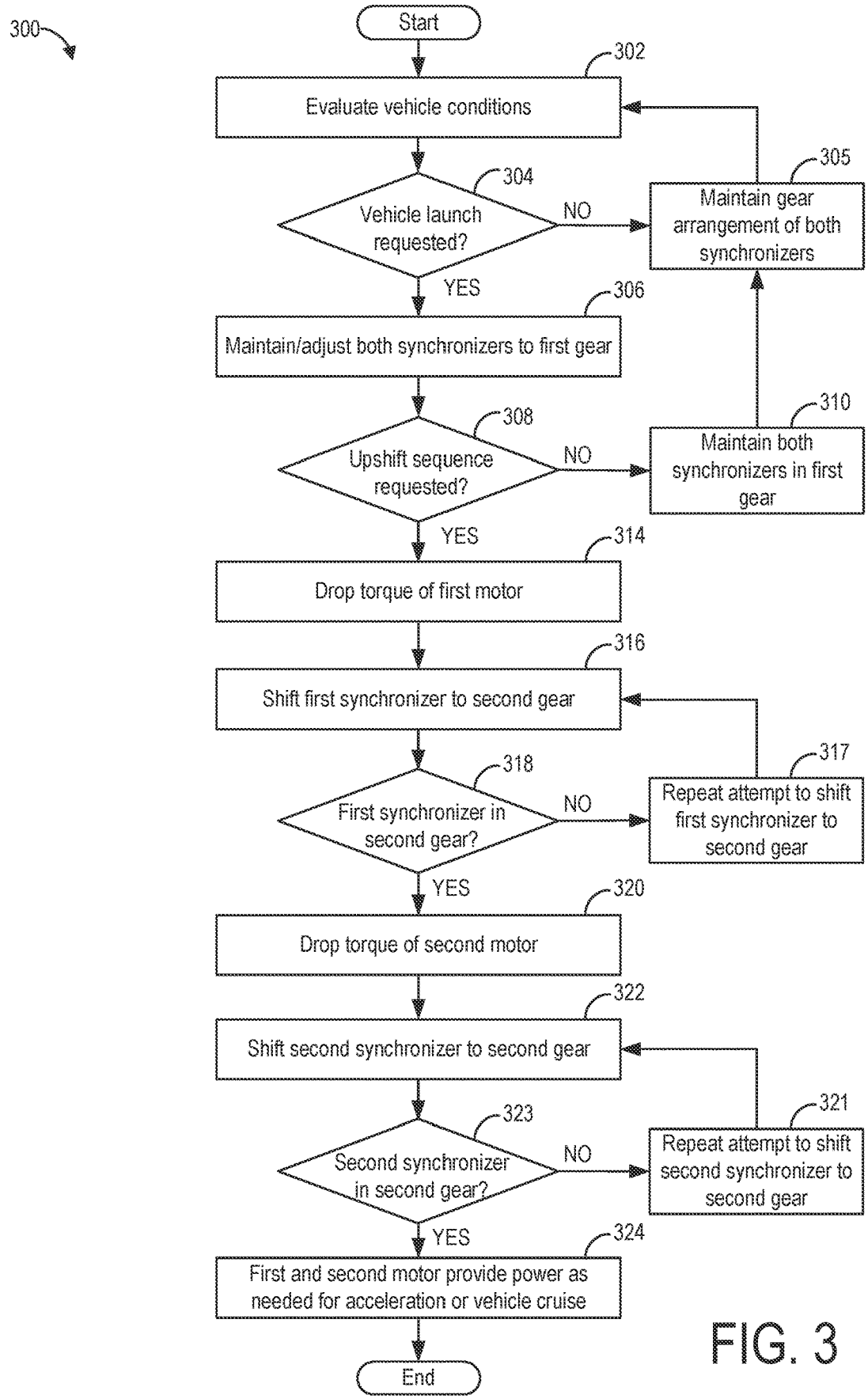
FIG. 3 shows a flow chart for an example of a method for gear shifting.
Figure 4:
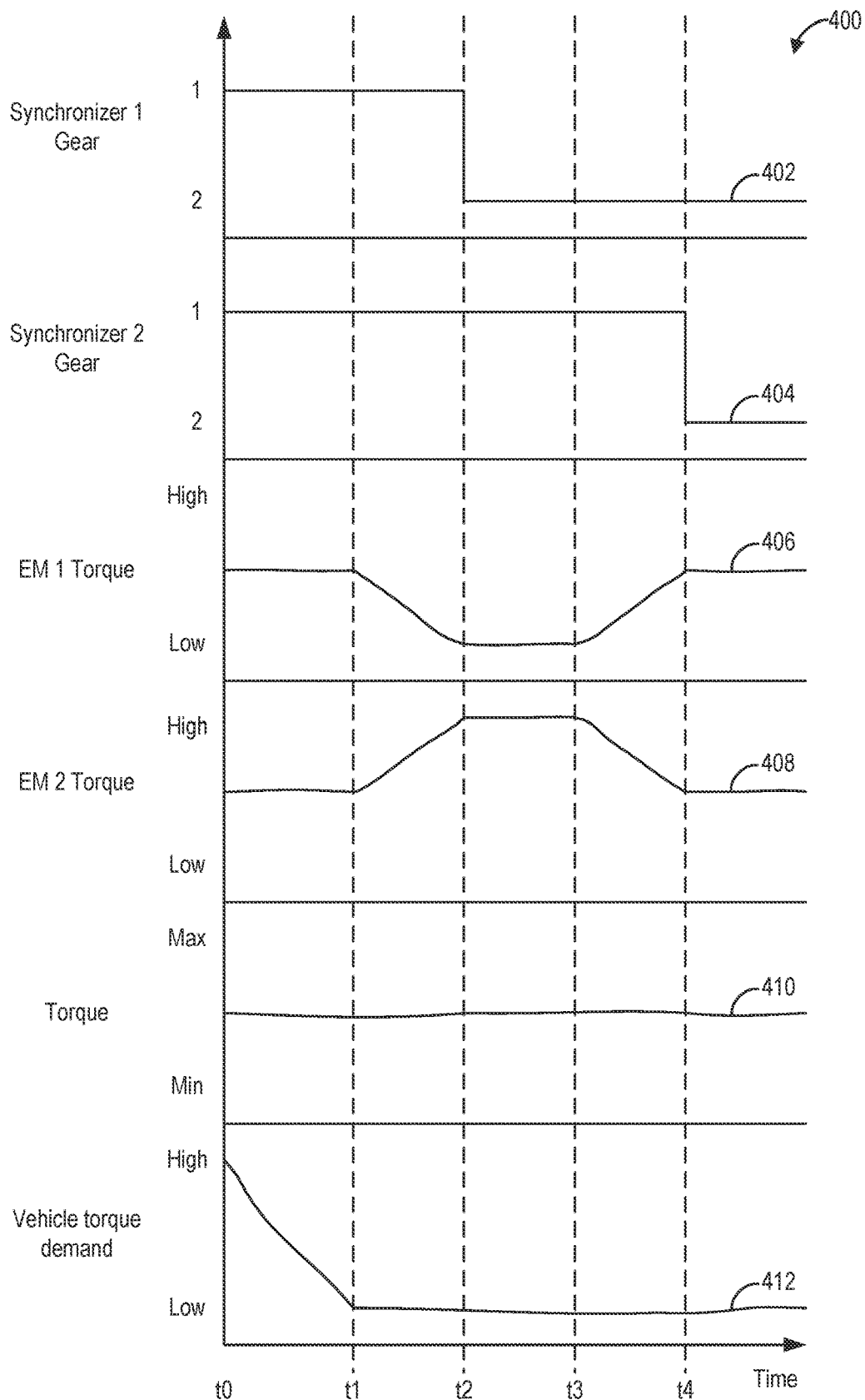
FIG. 4 shows an example timing diagram illustrating variations in synchronizer gears, motor torque, and vehicle torque during gear shifting.

FIG. 3 illustrates a flow chart for an example of a method 300 for gear shifting. Method 300 will be described with relation to the systems shown in FIGS. 1-2A, but it should be understood that similar methods may be used with other systems without departing from the scope of this disclosure. Instructions for carrying out method 300 may be executed by a controller (such as controller 126 of FIG. 1) based on instructions stored on a memory of the controller and in conjunction with signals received from sensors of the system, such as the sensors described above with reference to FIGS. 1-2A. The controller may employ actuators of the system to adjust synchronizer and motor operation, according to the methods described below.

Upon request for an upshift sequence, both of the first and the second electric motors drop torque sequentially to allow each of the first and the second synchronizers to shift to the second gear arrangement. In one example, the first and the second electric motors may be independently and inversely speed-controlled. For example, when the electric motors are symmetric, a voltage supplied to the first electric motor may be decreased by a first amount and a voltage supplied to the second electric motor may be increased by a second amount equal to an absolute value of the first amount during gear shifting. The second electric motor may increase torque output to compensate for the torque drop from the first motor. The first motor may increase torque output to compensate for the torque drop from the second motor. Once both the first and the second synchronizers are in the second gear, the first and second motor may provide power as needed for requested vehicle acceleration. In this way, torque interruption during gear shifting may be reduced by shifting one synchronizer at a time and the motor not corresponding to the shifting synchronizer supplying additional torque to compensate for the torque drop from the other motor to allow shifting of the associated synchronizer.

Method 300 begins at 302 by evaluating vehicle conditions, which may include various motor operating conditions (e.g., if the vehicle is stationary or in motion), gear position of the synchronizers (e.g., both the first and the second synchronizer in the first gear arrangement or the first synchronizer in the second gear arrangement and the second synchronizer in the first gear arrangement), vehicle speed, various ambient conditions, such as temperature, barometric pressure, humidity, battery state of charge (SOC), etc. Operating conditions may be measured by one or more sensors coupled to a controller, such as sensors 128 coupled to controller 126 of FIG. 1, or may be estimated or inferred based on available data.

At 304, method 300 determines if vehicle launch has been requested. In one example, vehicle launch may be requested by depression of an accelerator pedal. If vehicle launch is not requested at 304, method 300 maintains a gear arrangement of both the first and the second synchronizers at 305. Method 300 then returns to 302 to monitor vehicle conditions until vehicle launch is requested. Upon request for vehicle launch, method 300 continues to 306 to either maintain or adjust the first and the second synchronizers to the first gear arrangement, depending on the gear position of the synchronizers as determined at 302. Mechanical power may flow through a first mechanical power path, for example, the first mechanical power path 220 shown in FIG. 2B.

At 308, method 300 determines if an upshift sequence has been requested. The upshift sequence request may be triggered when it is determined that one of the two motors may provide sufficient torque without supplementary torque from the other of the two motors, in one example. In another example, the request may be triggered when vehicle torque demand is low. For example, low vehicle torque demand may be requested to operate the respective electric motor at a more efficient working point. In a third example, the request may be the result of an operator shifting gears at a manual gear shift. If the upshift sequence is not requested, both the first and the second synchronizers are maintained in the first gear arrangement at 310. Method 300 then returns to 302 to evaluate vehicle conditions.

If, at 308, the upshift sequence is requested, method 300 proceeds to 314 to drop torque of the first motor and increase torque of the second motor. In one example, torque of the first motor is dropped by 100% to allow the first motor to be free of torque and allow shifting to occur. Additionally, the first motor may actively adjust speed to assist with synchronization. When the first motor drops torque, rotation of the first transmission input shaft coupled to the first motor may decrease, allowing the first synchronizer to shift to the second gear arrangement at 316 and adjust the speed of rotation of the first transmission input shaft to match the speed of the requested second gear. In other words, the first synchronizer shifts from a low speed range to a high speed range by disengaging from the first fixed gear on the first transmission input shaft having a high gear ratio, such as 2.78 to 1, and engaging with the second fixed gear on the first transmission input shaft having a low gear ratio, such as 1 to 1, for example. In another example, the first and/or the second fixed gears may have different gear ratios. Additionally, at 316, the second electric motor may peak in performance, that is, increase torque output by a first amount equal to a second amount of torque dropped by the first electric motor to compensate for the torque drop of the first electric motor. In one example, the second electric motor peak performance may be a maximum torque output capable by the second electric motor at the current operating conditions, which may or might not equal the torque drop of the first electric motor.

At 318, method 300 determines if the first synchronizer has shifted to the second gear. In one example, the gear arrangement of the first synchronizer may be determined by a gear position sensor, for example, of the sensors 128 of FIG. 1. If the first synchronizer has not shifted to the second gear, method 300 repeats the attempt to shift the first synchronizer to the second gear at 317. Method 300 returns to 316 to shift the first synchronizer to the second gear arrangement. If at 318 the first synchronizer has successfully shifted to the second gear, mechanical power flows through a second mechanical power path, such as the second mechanical power path 241 shown in FIG. 2C. Method 300 continues to 320 to drop torque of the second motor and increase torque of the first motor. When the second motor drops torque, rotation of the second transmission input shaft coupled to the second motor may slow, allowing the second synchronizer to shift to the second gear arrangement at 322 and adjust the speed of rotation of the second transmission input shaft to match the speed of the requested second gear. In other words, the second synchronizer shifts from the low speed range to the high speed range by disengaging from the third fixed gear on the second transmission input shaft having a high gear ratio, such as 2.78 to 1, and engaging with the fourth fixed gear on the second transmission input shaft having a low gear ratio, such as 1 to 1. Additionally, at 322, the first synchronizer is maintained in the second gear arrangement and the first motor may peak in performance, that is, increase torque output by a third amount equal to a fourth amount of torque dropped by the second electric motor to compensate for the torque drop of the second motor.

At 323, method 300 determines if the second synchronizer has shifted to the second gear. If the second synchronizer has not shifted to the second gear, method 300 repeats the attempt to shift the second synchronizer to the second gear at 321. Method 300 returns to 322 to shift the second synchronizer to the second gear arrangement. If the second synchronizer has successfully shifted to the second gear, mechanical power flows through a third mechanical power path, for example, the third mechanical power path 260 shown in FIG. 2D. Method 300 continues to 324.

As determined by 318 and 323, both the first and the second synchronizers are in the second gear. At 324, the first and the second motors may provide power to accelerate the vehicle as requested with the high speed range gear (e.g., second gear) selected or maintain vehicle cruise. Method 300 ends.

Table 1, below, shows gear arrangements of the first and the second synchronizers during conditions described in method 300. Vehicle launch as described at 304 of method 300 and further in FIG. 4 uses the first mechanical power path, as shown in FIG. 2B. A first shifting transient state, after the first synchronizer has been shifted to the second gear arrangement at 318 of method 300 and further described in FIG. 4, uses the second mechanical power path, as shown in FIG. 2C. Vehicle cruise or acceleration as described at 324 of method 300 and further described in FIG. 4 uses the third mechanical power path, as shown in FIG. 2D.

TABLE 1

Synchronizer gear arrangements during vehicle shifting conditions

| Condition | First synchronizer | Second synchronizer |
| --- | --- | --- |
| Vehicle launch | First gear arrangement | First gear arrangement |
| First shifting transient | Second gear arrangement | First gear arrangement |
| Vehicle cruise or acceleration | Second gear arrangement | Second gear arrangement |

As the first synchronizer is shifted to the second gear arrangement while the second synchronizer is maintained in the first gear arrangement and the second motor provides peak performance to compensate for the torque drop of the first motor during shifting of the first synchronizer, torque interruption during gear shifting may be reduced, as the second motor compensates for a lack of torque from the first motor. Additionally, and similarly, when the second synchronizer shifts to the second gear arrangement after the first synchronizer has shifted to the second gear, the first motor provides peak performance to compensate for the torque drop of the second motor during shifting of the second synchronizer. In this way, at least one of the two electric motors is engaged and providing torque to the transmission and therefore powering the vehicle during gear shifting from the first to the second gear.

FIG. 4 shows an example timing diagram 400 illustrating variations in synchronizer gears, motor torque, and vehicle torque during gear shifting. The timing diagram may be implemented in a transmission of an e-drive of a vehicle including dual motors, such as transmission 208 of e-drive 200 of FIG. 2A. As described in respect to method 300 of FIG. 3, during gear shifting, the first and the second synchronizers shift from the first gear arrangement to the second gear arrangement independently and in sequence. At vehicle launch request, both the first and the second synchronizers are adjusted to or maintained in the first gear arrangement. Upon upshift request, which may be a result of low vehicle torque demand, determination that one of the two electric motors may independently supply requested torque, or manual upshift by an operator, the first electric motor torque is dropped to allow the coupled first synchronizer to shift to the second gear. The second electric motor may peak torque output to compensate for the torque drop of the first electric motor and maintain overall vehicle torque uninterrupted during the gear shift. Following shifting of the first synchronizer to the second gear, the second motor drops torque to allow the second synchronizer to shift to the second gear. The first electric motor may peak torque output to compensate for the torque drop of the second electric motor and maintain overall vehicle torque uninterrupted during the gear shift. Once both the first and the second synchronizer are in the second gear, the first and the second electric motors may adjust torque to fulfill a vehicle speed request.

Timing diagram 400 includes a first plot 402, illustrating a gear arrangement of the first synchronizer and a second plot 404 illustrating a gear arrangement of the second synchronizer. A third plot 406 illustrates a torque output from the first electric motor and a fourth plot 408 illustrates a torque output from the second electric motor. The synchronizers and electric motors may be arranged as described in FIG. 2A and adjusted according to method 300 of FIG. 3. A fifth plot 410 illustrates an overall torque of the e-drive, e.g., a sum of torque from the first and the second electric motors shown in the third and fourth plots 406, 408, and a sixth plot 412 illustrates a vehicle torque demand. For all plots of the timing diagram 400, time increases along the x-axis from a left to a right side of the figure. The first and the second plots 402 and 404 vary between a first gear arrangement and a second gear arrangement along the y-axis. For the third, the fourth, and the fifth plots 406, 408, and 410, torque increases upwards along the y-axis. For the sixth plot 412, vehicle torque demand varies between high and low along the y-axis.

At t0, vehicle launch is requested and the first and the second synchronizers shown in the first and the second plots 402, 404, respectively, are adjusted to or maintained in the first gear arrangement. At vehicle launch, vehicle torque demand is high, as shown by the sixth plot 412. The first and the second electric motors shown in the third and the fourth plots 406, 408, respectively, may have similar torque outputs. The overall torque shown in the fifth plot 410 is the sum of the third and the fourth plots 406, 408.

At t1, the upshift sequence is requested, which may be a result of low vehicle torque demand shown by the sixth plot 412, determination that one of the two electric motors may independently supply requested torque, or manual upshift by an operator. Between t1 and t2, torque of the first electric motor shown in the third plot 406 is dropped and torque of the second electric motor shown in the fourth plot 408 is increased to compensate for the torque drop of the first electric motor, such that overall torque shown in the fifth plot 410 is maintained at an approximately equal value from time t0 to beyond time t4, where approximate is within a torque range such that a vehicle operator may not notice a change in torque. In the example of FIG. 4, a magnitude of torque dropped by the first electric motor is equal to a magnitude of torque increase at the second electric motor. At t2, the first synchronizer shown in the first plot 402 shifts from the first gear arrangement to the second gear arrangement. The second synchronizer shown in the second plot 404 is maintained in the first gear arrangement and the second electric motor shown in the fourth plot 408 supplies a high torque output to compensate for the low torque output of the first electric motor shown in the third plot 406, allowing the overall torque shown in the fifth plot 410 to remain at approximately the same value. Additionally, vehicle torque demand remains low as shown by the sixth plot 412.

At t3, the system prepares to shift the second synchronizer shown in the second plot 404 from the first gear arrangement to the second gear arrangement by dropping torque of the second electric motor shown in the fourth plot 408 between t3 and t4. Torque of the first electric motor shown in the third plot 406 increases to compensate for the torque drop of the second electric motor and maintain the overall torque at an approximately equal value from time t0 to beyond time t4, as shown in the fifth plot 410. Additionally, vehicle torque demand remains low as shown by the sixth plot 412.

At t4, the second synchronizer shown in the second plot 404 shifts from the first gear arrangement to the second gear arrangement. The first synchronizer shown in the first plot 402 is maintained in the second gear arrangement and torque output of the first and the second electric motors shown in the third and the fourth plots 406, 408, respectively, may be similar. After t4, both the first and the second synchronizers shown in the first and the second plots 402, 404, respectively are in the second gear arrangement and the first and the second electric motors shown in the third and the fourth plots 406, 408, respectively, may power vehicle acceleration to the requested speed or maintain vehicle cruise. Overall torque as shown in the fifth plot 410 is maintained at an approximately equal value from time t0 to beyond time t4. Vehicle torque demand remains low as shown by the sixth plot 412.

In this way, the sequential shifting of the first synchronizer followed by the second synchronizer from the first gear arrangement to the second gear arrangement allows for at least partially uninterrupted torque during gear shifting, as output of each of the first or the second electric motor is adjusted to compensate for torque drop of the other electric motor to allow for shifting of the respective synchronizer.

In this way, the inclusion of two synchronizers, one coupled to each of two power sources, may allow both power sources to produce torque across the low speed range and the high speed range via shifting from the first gear arrangement to the second gear arrangement, respectively. Additionally, exclusion of clutches may reduce associated vehicle costs. The lay shaft with the first and the second synchronizers disposed thereon in series may be coupled to an output gear set, allowing for further torque reduction via a short drop gear and a long drop gear to adjust torque to meet vehicle operation requirements. During gear shifting, as the electric motor not coupled to the shifting synchronizer compensates for the torque drop of the other electric motor (e.g., the second electric motor compensates for torque drop of the first electric motor when the first synchronizer is shifting from the first to the second gear arrangement), torque may be uninterrupted during gear shifting.

The technical effect of increasing torque input from a first electric motor to compensate for torque drop from a second electric motor during shifting of a coupled second synchronizer from a first gear arrangement to a second gear arrangement is that a load on the electric motors may be reduced and power economy may be increased.

The disclosure also provides support for a transmission system comprising a first electric motor input shaft having two gears configured to mesh with a pair of gears of a first synchronizer on a lay shaft, a first electric motor coupled to the first electric motor input shaft, a second electric motor input shaft having at least one gear configured to mesh with one gear of another pair of gears of a second synchronizer on the lay shaft, and a second electric motor coupled to the second electric motor input shaft, wherein, the first electric motor and the second electric motor are configured to operate synchronously to increase torque supply with each of the first and the second synchronizers in a first gear arrangement, and independently to decrease torque supply to allow the respective first or the second synchronizer to shift to a second gear arrangement. In a first example of the system, the second electric motor input shaft comprises two gears configured to mesh with the pair of gears of the second synchronizer. In a second example of the system, optionally including the first example, during a vehicle launch operation approaching a vehicle maximum torque, both of the first and the second synchronizers are configured in the first gear arrangement. In a third example of the system, optionally including one or both of the first and second examples, during a cruising operation approaching a vehicle top speed, both of the first and the second electric motors drop torque sequentially to allow each of the first and second synchronizers to be configured in the second gear arrangement. In a fourth example of the system, optionally including one or more or each of the first through third examples, the first and second electric motors are speed-controlled when transitioning between gear arrangements, where speed-control maintains an increase in voltage supplied to the second electric motor is equal to an absolute value of a decrease in voltage supplied to the first electric motor equal. In a fifth example of the system, optionally including one or more or each of the first through fourth examples, the system further comprises: a transmission output gear set coupled to the lay shaft. In a sixth example of the system, optionally including one or more or each of the first through fifth examples, the output gear set creates a drop in the transmission where torque output by the transmission is less than torque input to the output gear set by the lay shaft. In a seventh example of the system, optionally including one or more or each of the first through sixth examples, the first and second electric motor input shafts and the lay shaft are arranged parallel to one another. In an eighth example of the system, optionally including one or more or each of the first through seventh examples, the first and the second synchronizers of the transmission system are dual synchronizers configured to reduce torque interruption during gear shifts without incorporating hydraulic clutches or planetary gear sets.

The disclosure also provides support for a power transmission system for a vehicle, comprising a first electric motor coupled to a first gear set via a first input shaft and a second electric motor coupled to a second gear set via a second input shaft, a common lay shaft arranged between and parallel with the first input shaft and the second input shaft, the common lay shaft including a first and a second dual synchronizer arranged in series along a first portion of the common lay shaft and coupled to the first input shaft and the second input shaft, respectively, and an output gear set coupled to the common lay shaft at a second portion of the common lay shaft, the second portion adjacent to the first portion, the output gear set configured to receive a torque output from one or more of the first electric motor and the second electric motor through the common lay shaft, wherein the torque output is modified based on selective engagement of the first and the second dual synchronizer with the first electric motor and the second electric motor, respectively. In a first example of the system, the first gear set includes a first fixed gear and a second fixed gear, and the first dual synchronizer selectively couples with the first fixed gear or the second fixed gear during engagement of the first dual synchronizer with the first electric motor. In a second example of the system, optionally including the first example, the first fixed gear comprises a higher gear ratio than the second fixed gear when either of the first or the second fixed gears are engaged with the first dual synchronizer. In a third example of the system, optionally including one or both of the first and second examples, the second gear set includes a third fixed gear and a fourth fixed gear, and the second dual synchronizer selectively couples with the third fixed gear or the fourth fixed gear to engage the second dual synchronizer with the second electric motor. In a fourth example of the system, optionally including one or more or each of the first through third examples, the third fixed gear has a higher gear ratio than the fourth fixed gear when either of the third or the fourth fixed gears are engaged with the second dual synchronizer.

The disclosure also provides support for a method for a transmission system for an electric vehicle, comprising, responsive to a high torque demand during a vehicle launch operation, providing power from each of a first electric motor and a second electric motor, the first electric motor and the second electric each coupled to a common lay shaft through a first synchronizer and a second synchronizer, respectively, and responsive to a decrease in the torque demand after the vehicle launch operation, adjusting a torque output at an output gear set coupled to the common lay shaft by varying engagements of the first electric motor and the second electric motor with the common lay shaft. In a first example of the method, the first electric motor is configured with a first transmission input shaft and the second electric motor is configured with a second transmission input shaft and the first transmission input shaft has two fixed gears thereon and the second transmission input shaft has at least one fixed gear thereon. In a second example of the method, optionally including the first example, the first electric motor is coupled to the first synchronizer via one of the two fixed gears of the first transmission input shaft and the second electric motor is coupled to the second synchronizer via one of the at least one fixed gears of the second transmission input shaft. In a third example of the method, optionally including one or both of the first and second examples, varying engagements of the first electric motor and the second electric motor with the common lay shaft includes dropping torque of the first electric motor and shifting the first synchronizer from a first gear arrangement to a second gear arrangement, followed by dropping torque of the second electric motor and shifting the second synchronizer from the first gear arrangement to the second gear arrangement. In a fourth example of the method, optionally including one or more or each of the first through third examples, the first electric motor increases torque output to compensate for the torque drop of the second electric motor when the second synchronizer is shifting from the first gear arrangement to the second gear arrangement, and, the second electric motor increases torque output to compensate for the torque drop of the first electric motor when the first synchronizer is shifting from the first gear arrangement to the second gear arrangement. In a fifth example of the method, optionally including one or more or each of the first through fourth examples when the first and the second synchronizers are in the second gear arrangement, the first and the second electric motors adjust torque output based on vehicle acceleration.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system comprising:
   a first electric motor input shaft having two gears configured to mesh with a first pair of gears of a first synchronizer on a lay shaft;
   a first electric motor coupled to the first electric motor input shaft;
   a second electric motor input shaft having at least one gear configured to mesh with one gear of a second pair of gears of a second synchronizer on the lay shaft; and a second electric motor coupled to the second electric motor input shaft;

wherein, the first electric motor and the second electric motor are configured to operate synchronously to increase torque supply with each of the first synchronizer and the second synchronizer in a first gear arrangement, and independently to decrease torque supply to allow the respective first synchronizer or the second synchronizer to shift to a second gear arrangement.

2. The system of claim 1, wherein the second electric motor input shaft comprises two gears configured to mesh with the second pair of gears of the second synchronizer.

3. The system of claim 1, wherein during a vehicle launch operation approaching a vehicle maximum torque, both of the first synchronizer and the second synchronizer are configured in the first gear arrangement.

4. The system of claim 1, wherein during a cruising operation approaching a vehicle top speed, both of the first electric motor and the second electric motor drop torque sequentially to allow each of the first synchronizer and the second synchronizer to be configured in the second gear arrangement.

5. The system of claim 1, wherein the first electric motor and the second electric motor are speed-controlled when transitioning between gear arrangements, where speed-control maintains an increase in voltage supplied to the second electric motor is equal to an absolute value of a decrease in voltage supplied to the first electric motor equal.

6. The system of claim 1, further comprising a transmission output gear set coupled to the lay shaft.

7. The system of claim 6, wherein the output gear set creates a drop in the transmission where torque output by the transmission is less than torque input to the output gear set by the lay shaft.

8. The system of claim 1, wherein the first electric motor input shaft, the second electric motor input shaft, and the lay shaft are arranged parallel to one another.

9. The system of claim 1, wherein the first synchronizer and the second synchronizer of the transmission system are dual synchronizers configured to reduce torque interruption during gear shifts without incorporating hydraulic clutches or planetary gear sets.

10. A power transmission system for a vehicle, comprising:

a first electric motor coupled to a first gear set via a first input shaft and a second electric motor coupled to a second gear set via a second input shaft;

a common lay shaft arranged between and parallel with the first input shaft and the second input shaft, the common lay shaft including a first dual synchronizer and a second dual synchronizer arranged in series along a first portion of the common lay shaft and coupled to the first input shaft and the second input shaft, respectively; and an output gear set coupled to the common lay shaft at a second portion of the common lay shaft, the second portion adjacent to the first portion, the output gear set configured to receive a torque output from one or more of the first electric motor and the second electric motor through the common lay shaft, wherein the torque output is modified based on selective engagement of the first and the second dual synchronizer with the first electric motor and the second electric motor, respectively, wherein the first gear set includes a first fixed gear and a second fixed gear, and the first dual synchronizer selectively couples with the first fixed gear or the second fixed gear during engagement of the first dual synchronizer with the first electric motor.

11. The system of claim 10, wherein the first fixed gear comprises a higher gear ratio than the second fixed gear when either of the first fixed gear or the second fixed gear are engaged with the first dual synchronizer.

12. A power transmission system for a vehicle, comprising:

a first electric motor coupled to a first gear set via a first input shaft and a second electric motor coupled to a second gear set via a second input shaft;

a common lay shaft arranged between and parallel with the first input shaft and the second input shaft, the common lay shaft including a first dual synchronizer and a second dual synchronizer arranged in series along a first portion of the common lay shaft and coupled to the first input shaft and the second input shaft, respectively; and an output gear set coupled to the common lay shaft at a second portion of the common lay shaft, the second portion adjacent to the first portion, the output gear set configured to receive a torque output from one or more of the first electric motor and the second electric motor through the common lay shaft, wherein the torque output is modified based on selective engagement of the first and the second dual synchronizer with the first electric motor and the second electric motor, respectively, wherein the second gear set includes a third fixed gear and a fourth fixed gear, and the second dual synchronizer selectively couples with the third fixed gear or the fourth fixed gear to engage the second dual synchronizer with the second electric motor.

13. The system of claim 12, wherein the third fixed gear has a higher gear ratio than the fourth fixed gear when either of the third fixed gear or the fourth fixed gear are engaged with the second dual synchronizer.

* * * * *